June 10, 1924.
J. M. COOTE
AUTOMOBILE BUMPER
Filed Sept. 14, 1923
1,497,653
2 Sheets-Sheet 1
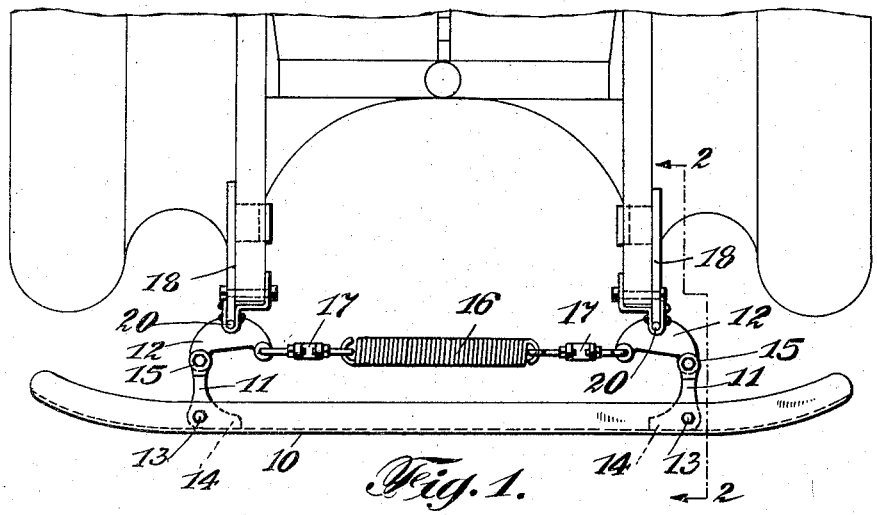
Fig. 1.
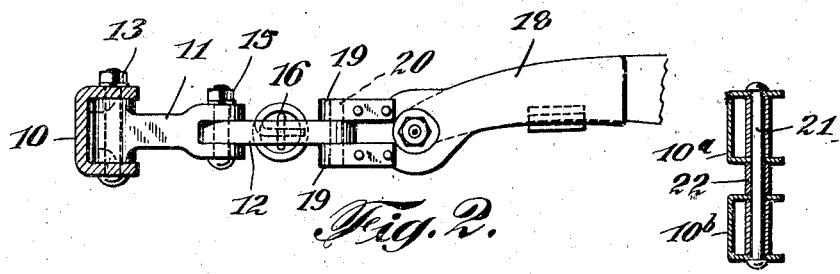
Fig. 2.
Fig. 4.
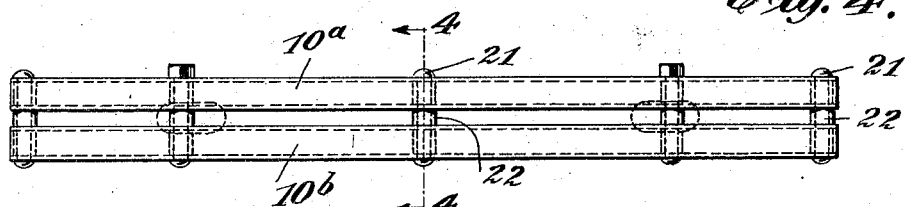
Fig. 3.
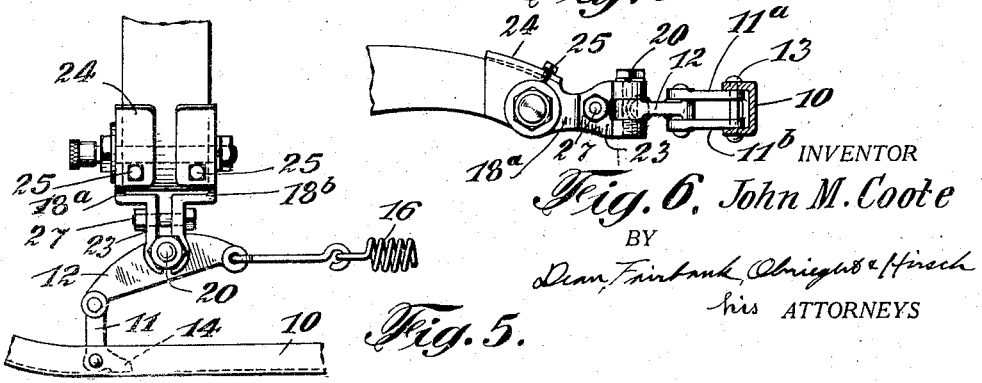
Fig. 5.
Fig. 6.
INVENTOR
John M. Coote
BY
Dean, Fairbank, Obrieght & Hirsch
his ATTORNEYS June 10, 1924.  
J. M. COOTE  
AUTOMOBILE BUMPER  
Filed Sept. 14, 1923

INVENTOR  
John M. Coote  
BY  
Dean, Fairbank, Albright & Hinett  
his ATTORNEYS Patented June 10, 1924.

1,497,653

UNITED STATES PATENT OFFICE.

JOHN M. COOTE, OF ELIZABETH, NEW JERSEY, ASSIGNOR TO COOTE PRODUCTS CORPORATION, OF NEW YORK, N. Y., A CORPORATION OF NEW YORK.

AUTOMOBILE BUMPER.

Application filed September 14, 1923. Serial No. 662,618.

*To all whom it may concern:*

Be it known that I, JOHN M. COOTE, a citizen of the United States, and resident of Elizabeth, in the county of Union and State of New Jersey, have invented certain new and useful Improvements in Automobile Bumpers, of which the following is a specification.

This invention is an improvement in automobile bumpers, and relates particularly to that type in which the bumper bar or impact member is connected to the vehicle body or frame by yielding or resilient means which pemits of a relative movement of the impact member and the vehicle in case of collision.

In my improved construction the supporting means for the impact member is disposed in substantially the same horizontal plane as the impact member, so that it is thereby protected, and the mechanism is such that the opposite ends of the impact member may move through different distances without any binding action. Pivoted links are employed and these are so designed and mounted that they permit of the movement of the impact member toward and from the vehicle but prevent any endwise movement in a direction transverse to that of the direction of travel of the vehicle.

As one important feature, each of the pivoted links which support the bumper bar or impact member can swing in only one direction from a normal position and is yieldingly held against movement in said direction from the normal position. By making the two links swing in opposite directions from the normal, they form a substantially rigid support which prevents any endwise movement of the impact member but permits of a yieldingly resisted movement toward the frame of the vehicle.

A further object of my invention is to provide a bumper bar support or attaching means which may be easily and rigidly secured to different designs of chassis spring horns, and on different widths of automobile frames.

In the accompanying drawings I have illustrated certain embodiments of my invention, but it will be obvious that other forms might be designed within the scope of my invention as defined in the appended claims. In these drawings:

Fig. 1 is a top plan view of one embodiment of my invention.

Fig. 2 is a section on the line 2—2 of Fig. 1, but on a larger scale.

Fig. 3 is a front view of an alternative form of impact member.

Fig. 4 is a sectional detail on the line 4—4 of Fig. 3, but on a larger scale.

Fig. 5 is a top plan view of a portion of the device showing an alternative form of attaching clamp.

Fig. 6 is an end view of the parts shown in Fig. 5, and

Figure 7:
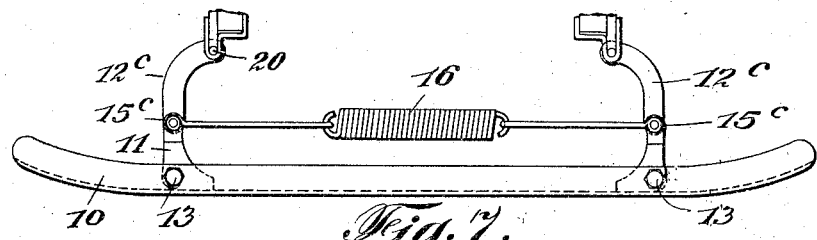
Figs. 7, 8, 9, 10 and 11 are top plan views of other alternative forms of bumper bar supporting means.

In the construction shown in Figs. 1 and 2, the impact member or bumper bar 10 is in the form of a channel with vertical web and rearwardly facing flanges. The terminal portions of the bar are preferably curved rearwardly and may be rounded if desired. Although this form of impact member is well adapted for use with my improved supporting means, I do not wish to be limited to this particular type of bar. The supporting means includes a pair of links 11 which are pivotally connected to the impact member and a pair of links 12 which are pivotally connected to the first mentioned links and to the chassis frame. Each link 11 is connected to the impact member by a pivot pin or bolt 13 which preferably extends through or into the upper and lower flanges of the impact member so that a portion of each link 11 is seated or mounted within the channel. Each link 11 has a laterally projecting portion or toe 14 adapted to engage with the impact member adjacent to the pivot 13 so as to prevent the link from swinging in one direction from the normal. The two lateral projections or toes 14 extend toward each other so that the rearwardly projecting body portions of the two links cannot swing toward each other from the normal position but can swing away from each other.

The links 12 are pivotally supported intermediate of their ends on the vehicle frame and each link 12 has its outer end connected to the rearwardly projecting part of the corresponding link 11 by a pivot pin or bolt 15. The opposite ends of the two links 12 extend toward each other and are connected by spring means. This is shown in Fig. 1 as including a tension spring 16 connected by turnbuckles 17 so that the tension of the spring may be adjusted.

The brackets shown in Figs. 1 and 2 for mounting the links or levers 12 on the chassis frame, include a plate 18 adapted to be clamped to the spring horn and having forwardly projecting ears or pintle sleeves 19 for a pivot pin 20 which extends through the lever 12. Each lever 12 is preferably of substantially bell crank construction, that is, the fulcrum pin 20 is in the rear of the pivot pin 15 and the connection between the spring 16 and the other end of the lever 12. Thus as pressure is applied to the impact member to force the link 11 rearwardly, the direction of movement of the opposite end of the link or lever 12 will have a materially larger component transversely of the vehicle than would be the case were the lever a straight one. Therefore the spring acts effectively to resist any rearward movement of the levers. As the spring tries to draw the inner end portion of the links 12 into alignment it tends to swing the rear ends of the levers 11 toward each other, but this movement is limited by the engagement of the projections 14 with the impact bar. The parts thus normally retain the position indicated in Fig. 1, but an impact on the bar, as for instance in case of collision, permits either or both ends of the bar to move rearwardly. This movement is yieldingly resisted by the spring as it causes a forward and separating movement of the inner ends of the links 12. The rear ends of the links 11 also swing away from each other during a rearward movement of the impact bar, and such separating movement is also yieldingly resisted by the spring means.

Although the impact member shown is of what is commonly known as the rigid bar type, other types of impact members might be employed. In Figs. 3 and 4 I have shown another form of the rigid bar type in which there are two superposed channel members 10$^a$ and 10$^b$ held rigid in respect to each other by connecting bolts 21 extending through the flanges of the channel members. The bars may be spaced by collars 22. The link corresponding to the link 11 may have terminal portions extending into each of the channel members 10$^a$ and 10$^b$.

In order to better adapt the attaching means to various types of chassis or spring horns, the attaching means is preferably constructed as shown in Figs. 5 and 6. The bracket here shown includes two sections 18$^a$ and 18$^b$ having plate portions adapted to engage with the opposite sides of the spring horn. Each section has a forwardly extending flange 23 and a laterally extending flange 24. Each section has an aperture to receive the end of the shackle bolt or terminal spring connection, and the two sections are held together by a clamping bolt 27. The front ends of the flanges 23 are curved to form the opposite sides of a bearing for the pivot bolt 20. By tightening the bolt 27 the two sections 18$^a$ and 18$^b$ of the bracket are clamped against opposite sides of the spring horn and the front ends of the flanges are held against opposite sides of the pivot bolt 20. The flanges 24 preferably have adjusting screws 25 bearing upon the upper surface of the spring horn so that the parts may be rigidly secured. The link 11 is shown in Figs. 1 and 2 as having a yoke to receive the end of the link 12. In Fig. 6 a modified form is shown in which the link is made of two superposed sections 11$^a$ and 11$^b$. These have the same lateral projection or toe 14 as in the form shown in Fig. 1.

Figure 8:
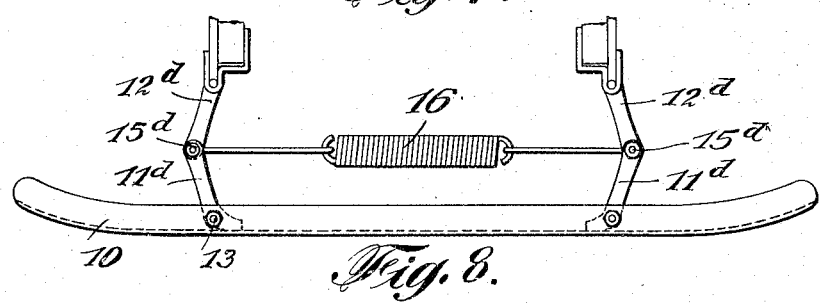

In Figs. 7 to 11 inclusive I have shown certain alternative bumper bar supporting means. Instead of having the lever 12 pivoted intermediate of the ends, it may be supported at one end only. In Fig. 7 there is shown a lever 12$^c$ having one end pivoted to the chassis and the other end connected by a pivot pin 15$^c$ to the link 11. A spring 16 may be connected directly to the two pivot pins 15$^c$ and tend to draw them toward each other. The pivot pins 15$^c$ may be directly in the rear of the pivot pins 13 if the levers 12$^c$ be inclined or curved so that the three pivot pins are not in the same plane. In Fig. 8 there is a very similar construction to that shown in Fig. 7 except that the links 11$^d$ and 12$^d$ are inclined in respect to each other so that an impact on the bumper bar will act more directly to spread apart the pivot pins 15$^d$ against the resistance of the spring 16.

Figure 9:
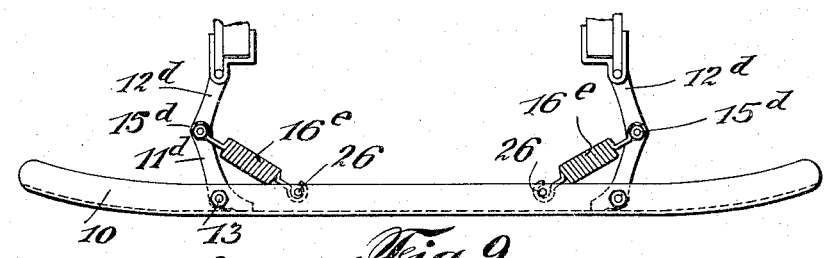

In Fig. 9 I have shown a construction substantially identical with that shown in Fig. 8, except that instead of employing a single spring to connect the two pairs of links I employ two springs 16$^e$, each extending from the pivot pins 15$^d$ to terminals 26 on the bumper bar itself.

Figure 10:
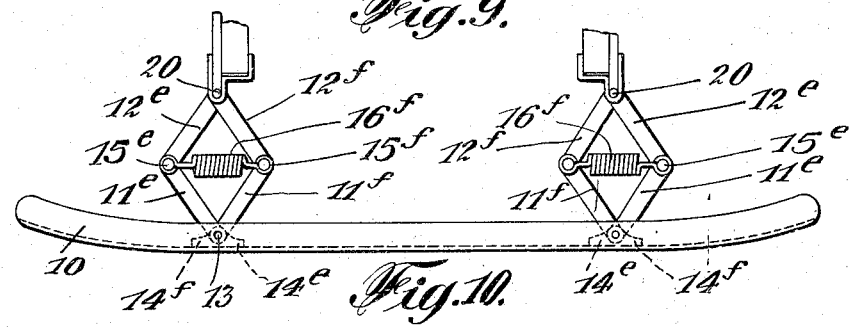

In Fig. 10 I employ two pairs of links at each end of the impact bar and having their impact bar engaging projection facing in opposite directions. The two links 12$^e$ and 12$^f$ are both pivoted to the same pivot pin 20, and the two links 11$^e$ and 11$^f$ are pivoted to the same pin 13 but the projections or toes 14$^e$ and 14$^f$ extend in opposite directions, the projection 14$^e$ being on the link 11$^e$, and the projection 14$^f$ on the link 11$^f$. The pivot pins 15$^e$ and 15$^f$ which connect the links 12$^e$ and 12$^f$ to the links 11$^e$ and 11$^f$, are spaced apart and are connected by a spring 16$^f$. The action of the springs is to hold the projections 14$^e$ and 14$^f$ against the impact bar, and to thus prevent any endwise movement of the impact bar when in its forward or normal position. Either end may be forced rearwardly independently of the other, as in the other constructions.

Figure 11:
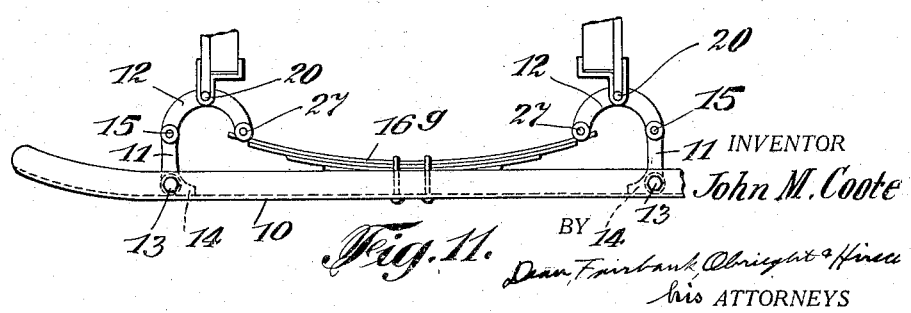

In Fig. 11 I have shown a link arrangement substantially identical with that shown in Fig. 1, except that the spring $16^g$ is of the leaf type and is secured to the impact bar 10 intermediate of the ends of the latter. The terminals of the spring press rearwardly on bearings 27. The spring 16 is under compression, that is, the terminal portions exert rearward pressure on the bearings 27. The bearings cannot move rearwardly except upon a movement of the pivot pins 15 toward each other, but this movement is prevented by the engagement of the projections 14 with the impact bar. The rearward movement of the impact bar causes a rearward movement of the center of the spring, but also a forward movement of the ends of the spring. Both of these movements are yieldingly resisted by the spring. It will be apparent that leaf springs might be employed in some of the other forms above described in place of the coil springs there shown.

In order to facilitate the attachment of the bumper to vehicles of different widths of chassis, the impact member may be provided with a plurality of holes spaced along the length thereof so that the pivot bolts 13 may be properly adjusted in respect to the width of the vehicle frame. If desired, the construction may be shipped without any such holes and the holes may be drilled in the proper position at the time the bumper is to be attached. By varying the spacing of the two pivot bolts 13 the bumper bar may be given a normal position nearer to or farther from the vehicle frame. For instance, by spacing the pivot bolts 13 slightly farther apart the links 12 may be caused to take a different position, and the normal position of the impact member will be slightly in the rear of that shown.

Having thus described my invention, what I claim as new and desire to secure by Letters Patent is:

1. A vehicle bumper including an impact element a supporting link pivoted thereto, means for preventing said link from swinging in one direction from a normal position, and means for yieldingly resisting the swinging movement of the link in the opposite direction from said normal position.

2. A vehicle bumper including a rigid bar adapted to serve as an impact element, a supporting link pivoted thereto, a link pivoted to the first mentioned link and to the vehicle frame, means for preventing the first mentioned link from swinging in one direction from a normal position, and means for yieldingly resisting the swinging movement of the first mentioned link in the opposite direction from said normal position.

3. A vehicle bumper including an impact element, a pair of links pivoted thereto and extending rearwardly therefrom, spring means yieldingly resisting the movement of the rearwardly projecting portions away from each other, and means on each link and engaging with the impact member for limiting the movement of said portions toward each other.

4. A vehicle bumper including an impact element, a pair of links pivoted thereto and extending rearwardly therefrom, spring means yieldingly resisting the movement of the reawardly projecting portions away from each other, means on each link and engaging with the impact member for limiting the movement of said portions toward each other, and a second pair of links pivotally connected to the first mentioned links and to the vehicle frame.

5. A vehicle bumper including an impact element, a pair of links pivoted thereto and extending rearwardly therefrom, spring means yieldingly resisting the movement of the rearwardly projecting portions away from each other, means on each link and engaging with the impact member for limiting the movement of said portions toward each other, and means for connecting said rearwardly extending portions to the vehicle frame and permitting lateral movement thereof in respect to the frame.

6. A vehicle bumper including an impact element, a pair of links pivoted thereto at spaced points, and each having a lateral projection adjacent to the point of pivotal connection to prevent swinging movement of each link in one direction from a normal position, spring means for yieldingly resisting swinging of each link in the opposite direction, and means for connecting each link to the vehicle frame.

7. A vehicle bumper including an impact element, a pair of links pivoted thereto at spaced points, and each having a lateral projection adjacent to the point of pivotal connection to prevent swinging movement of each link in one direction from a normal position, spring means for yieldingly resisting swinging of each link in the opposite direction, a second pair of links, pivotal connections between each of the second mentioned links and the corresponding link of the first mentioned pair, and pivotal connections between the second mentioned pair and the vehicle frame.

8. A vehicle bumper including an impact element, a pair of links each having means intermediate of its ends for pivotally connecting it to the vehicle frame, a pair of links each pivotally connected to one end of a corresponding link of the first mentioned pair and pivotally connected to the impact element, and spring means acting upon the other end of each of the first mentioned links.

9. A vehicle bumper, including an impact element, a pair of links pivoted thereto and extending rearwardly therefrom, each of said links having a lateral projection engaging with the impact element, and said projections extending toward each other, means for connecting the rear terminals of said links to the vehicle frame and permitting relative movement of said links in respect to the frame, and spring means for resisting the separating movement of said terminal portions.

10. A vehicle bumper including an impact element, a pair of links, connections between each link and said impact member, and means for pivotally supporting each link on a vehicle frame, said means including a pivot pin and a pair of sections adapted to be clamped together and engage with opposite sides of a chassis part and with opposite sides of the pivot pin.

11. A fastening device for automobile bumper constructions which comprises a pair of plates each having a forwardly extending flange and a laterally extending flange, said plates adapted to engage with opposite sides of a chassis part with the lateral flanges overlying said part, and said forwardly extending flanges having coacting faces forming a bearing for a pivot pin, and means intermediate of the ends of said plates for clamping them together.

Signed at New York, in the county of New York and State of New York, this 11th day of September, A. D. 1923.

JOHN M. COOTE.